United States Patent
Iijima et al.

(10) Patent No.: US 10,619,512 B2
(45) Date of Patent: Apr. 14, 2020

(54) ROTARY MACHINE AND METHOD FOR CONTROLLING ROTARY MACHINE

(71) Applicant: Mitsubishi Hitachi Power Systems, Ltd., Kanagawa (JP)

(72) Inventors: Takayoshi Iijima, Yokohama (JP); Shinya Hashimoto, Yokohama (JP); Masahito Kataoka, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 99 days.

(21) Appl. No.: 15/770,645

(22) PCT Filed: Oct. 25, 2016

(86) PCT No.: PCT/JP2016/081594
§ 371 (c)(1),
(2) Date: Apr. 24, 2018

(87) PCT Pub. No.: WO2017/073565
PCT Pub. Date: May 4, 2017

(65) Prior Publication Data
US 2018/0320551 A1 Nov. 8, 2018

(30) Foreign Application Priority Data
Oct. 28, 2015 (JP) ................. 2015-212134

(51) Int. Cl.
F01D 25/16 (2006.01)
F01D 3/04 (2006.01)
(Continued)

(52) U.S. Cl.
CPC ............ F01D 25/162 (2013.01); F01D 3/04 (2013.01); F01D 25/16 (2013.01); F01D 25/168 (2013.01);
(Continued)

(58) Field of Classification Search
CPC .......... F01D 3/04; F01D 25/16; F01D 25/162; F01D 25/168; F16C 17/04; F16C 17/02;
(Continued)

(56) References Cited

U.S. PATENT DOCUMENTS 4,309,144 A    1/1982  Eggmann et al.
5,141,389 A *  8/1992  Bear ................. F01D 3/00
                                                     277/348
(Continued)

FOREIGN PATENT DOCUMENTS

JP    49-017704    5/1974
JP    55-024291    2/1980
(Continued)

OTHER PUBLICATIONS

International Search Report dated Jan. 10, 2017 in International (PCT) Application No. PCT/JP2016/081594.
(Continued)

Primary Examiner — Igor Kershteyn
(74) Attorney, Agent, or Firm — Wenderoth, Lind & Ponack, L.L.P.

(57) ABSTRACT

A rotary machine, including:
a rotor (2) extending in an axial direction, the rotor including a first thrust collar (35) and a second thrust collar (36) projecting radially outward; a first thrust bearing device (31) configured to receive load acting in the axial direction via the first thrust collar (35); a second thrust bearing device (32) configured to receive load acting in the axial direction via the second thrust collar (36); and a load control device (16) configured to control load acting on at least one of the first thrust bearing device (31) and the second thrust bearing device (32).

9 Claims, 5 Drawing Sheets

(51) Int. Cl.
*F16C 17/04* (2006.01)
*F16C 27/06* (2006.01)
*F16C 17/26* (2006.01)
*F16C 33/10* (2006.01)
*F16C 17/02* (2006.01)

(52) U.S. Cl.
CPC .............. *F16C 17/02* (2013.01); *F16C 17/04* (2013.01); *F16C 17/26* (2013.01); *F16C 27/06* (2013.01); *F16C 33/1045* (2013.01); *F05D 2240/52* (2013.01); *F05D 2260/15* (2013.01); *F16C 2360/24* (2013.01)

(58) Field of Classification Search
CPC ...... F16C 17/26; F16C 27/06; F16C 33/1045; F16C 2360/24; F05D 2240/52; F05D 2260/15
See application file for complete search history.

(56) References Cited

U.S. PATENT DOCUMENTS

| | | | | |
|---|---|---|---|---|
| 5,741,116 A | * | 4/1998 | Hudson | F16C 17/06 415/104 |
| 5,791,868 A | * | 8/1998 | Bosley | F01D 3/04 415/104 |
| 5,827,040 A | * | 10/1998 | Bosley | F01D 25/168 415/106 |
| 6,457,933 B1 | * | 10/2002 | Przytulski | F01D 3/00 415/1 |
| 8,672,610 B2 | * | 3/2014 | Berger | F01D 25/16 415/104 |

FOREIGN PATENT DOCUMENTS

| | | |
|---|---|---|
| JP | 09-170401 | 6/1997 |
| JP | 2002-310142 | 10/2002 |
| JP | 2014-080990 | 5/2014 |
| JP | 2014-118909 | 6/2014 |

OTHER PUBLICATIONS

Written Opinion of the International Searching Authority dated Jan. 10, 2017 in International (PCT) Application No. PCT/JP2016/081594.

* cited by examiner

ROTARY MACHINE AND METHOD FOR CONTROLLING ROTARY MACHINE

TECHNICAL FIELD

The present invention relates to a rotary machine and a method for controlling a rotary machine.

This application claims priority based on JP 2015-212134 filed in Japan on Oct. 28, 2015, of which the contents are incorporated herein by reference.

BACKGROUND ART

Typically, a rotary machine with a rotor (rotating shaft) such as a gas turbine is provided with a thrust bearing device that receives thrust load (force acting in the axial direction) of the rotor.

In recent years, as the output of gas turbines has increased, the thrust load borne by a thrust bearing device has also increased. For example, Patent Document 1 describes a device for reducing the thrust load of a rotor that is provided with a piston on an end portion of a rotor, the piston moving in an axial direction via oil pressure.

CITATION LIST

Patent Document

Patent Document 1: JP 09-170401 A

SUMMARY OF INVENTION

Technical Problem

The known device described above has a configuration in which oil pressure is used to drive the piston, which is a rotating body. This causes problems involving the seal for the hydraulic oil, and high pressure cannot be applied. Thus, such a configuration is unable to cope with a high thrust load on the rotor of the rotary machine.

An object of this invention is to provide a rotary machine including a thrust bearing device that receives thrust load of a rotor, the rotary machine being able to manage high thrust loads, and a method for controlling a rotary machine.

Solution to Problems

According to a first aspect of the present invention, a rotary machine includes a rotor extending in an axial direction, the rotor including a first thrust collar and a second thrust collar projecting radially outward;

a first thrust bearing device configured to receive load acting in the axial direction via the first thrust collar;

a second thrust bearing device configured to receive load acting in the axial direction via the second thrust collar; and a load control device configured to control load acting on at least one of the first thrust bearing device and the second thrust bearing device.

According to such a configuration, when the load acting in the axial direction is excessive, by controlling the load acting on at least one of the first thrust bearing device and the second thrust bearing device, the loads on the thrust bearing devices are leveled and the excessive load is managed.

In the rotary machine described above, the second thrust bearing device may include a second thrust bearing body configured to support a surface of the second thrust collar facing the axial direction; and the load control device may include a drive device configured to press the second thrust bearing body in the axial direction.

In the rotary machine described above, the second thrust bearing body may include a bearing pad configured to support load from the second thrust collar, and a carrier ring configured to support the bearing pad; and the drive device may be configured to press the bearing pad.

In the rotary machine described above, the second thrust bearing body may include a bearing pad configured to support load from the second thrust collar, and a carrier ring configured to support the bearing pad; and the drive device may be configured to press the carrier ring.

In the rotary machine described above, the second thrust bearing body may be disposed only on one side of the second thrust collar in the axial direction.

According to such a configuration in which the thrust bearing body are not disposed on both sides of the thrust collar, the number of thrust bearing bodies can be reduced.

In the rotary machine described above, the first thrust bearing device may include a first thrust bearing body configured to support a surface of the first thrust collar facing the axial direction; and the first thrust bearing body may be disposed on either side of the first thrust collar in the axial direction.

According to such a configuration, thrust load of the rotor can be received when the rotor is pressed in either axial direction.

In the rotary machine described above, the load control device may include a first oil supply system configured to supply oil to the drive device, and a controller configured to control oil pressure of the oil; and the drive device may be configured to press the second thrust bearing body via the oil pressure in a direction opposite a direction load acts on the second thrust bearing device.

In the rotary machine described above, the drive device may include a drive rod including a pressing portion configured to press the second thrust bearing body, and an elastic member configured to urge the drive rod in a direction which the pressing portion separates away from the second thrust bearing body.

According to such a configuration, when the oil pressure of the drive device is low, the drive rod can be returned in the direction away from the second thrust bearing body.

In the rotary machine described above, at least one of the first thrust bearing body and the second thrust bearing body may include a bearing pad opposing a surface of the respective thrust collar facing the axial direction; and may further include a second oil supply system configured to supply lubricating oil between the bearing pad and the surface of the respective thrust collar facing the axial direction.

According to such a configuration, by two types of systems, the lubricating oil-supplying system and the hydraulic oil-supplying system, being provided as oil supplying systems, the oil pressure can be independently controlled.

According to a second aspect of the present invention, a method for controlling a rotary machine that includes a rotor extending in an axial direction and a first thrust bearing and a second thrust bearing configured to receive load acting on the rotor in the axial direction, includes a first operation step in which mainly the first thrust bearing receives the load; a load monitoring step in which the load is monitored; and a second operation step in which, when the load reaches a preset value, the first thrust bearing and the second thrust bearing receive the load.

Advantageous Effects of Invention

According to an embodiment of the present invention, a rotary machine including a thrust bearing device that receives thrust load of a rotor can manage high thrust loads.

DESCRIPTION OF EMBODIMENTS

A gas turbine, which is a rotary machine of an embodiment of the present invention, will be described below in detail with reference to the attached drawings.

Figure 1:
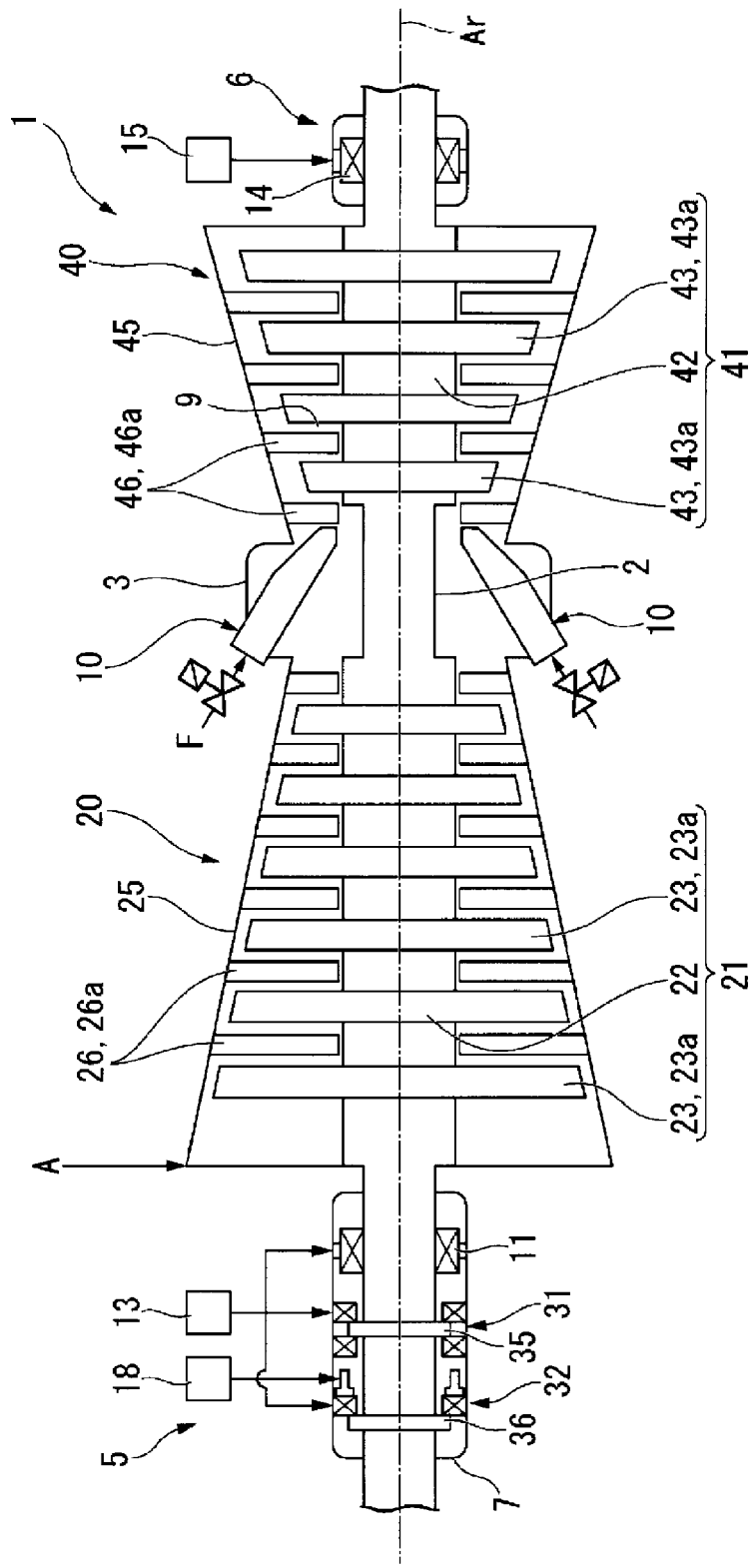
FIG. 1 is a schematic cross-sectional view of a gas turbine according to an embodiment of the present invention.

As illustrated in FIG. 1, a gas turbine 1 includes a compressor 20 that compresses air A, a combustor 10 that generates a combustion gas by burning a fuel F in the air compressed by the compressor 20, and a turbine 40 driven using the combustion gas.

The compressor 20 includes a compressor rotor 21 that rotates about an axial line Ar, a compressor casing 25 that covers the compressor rotor 21, and a plurality of vane stages 26. The turbine 40 includes a turbine rotor 41 that rotates about the axial line Ar, a turbine casing 45 that covers the turbine rotor 41, and a plurality of vane stages 46.

The compressor rotor 21 and the turbine rotor 41 are positioned on the same axial line Ar and are connected to each other to form a gas turbine rotor 2 (referred to as rotor 2 below). Rotor 2 extends in the axial direction. A rotor of a generator, for example, may be connected to the rotor 2. The compressor casing 25 and the turbine casing 45 are connected to each other to form a gas turbine casing 3.

In the description below, the direction in which the rotor 2, i.e., the rotating shaft, extends (the direction along the axial line Ar illustrated in FIG. 1) is defined as the axial direction. The direction orthogonal to the axial line Ar is defined as the radial direction. The direction away from the axial line Ar in the radial direction is referred to as outwards in the radial direction, and the direction towards the axial line Ar in the radial direction is referred to as inwards in the radial direction. Also, in reference to the axial direction, the side of the turbine 40 toward the compressor 20 is referred to as upstream, and the side of the compressor 20 toward the turbine 40 is referred to as downstream.

The compressor rotor 21 includes a rotor shaft 22 that extends centered along the axial line Ar, and a plurality of blade stages 23 attached to the rotor shaft 22. The plurality of blade stages 23 are aligned in the axial direction. Each of the blade stages 23 includes a plurality of blades 23a aligned in the circumferential direction. The plurality of vane stages 26 are disposed downstream of the respective plurality of blade stages 23. Each of the vane stages 26 is provided inside the compressor casing 25. Each of the vane stages 26 includes a plurality of vanes 26a aligned in the circumferential direction.

The turbine rotor 41 includes a rotor shaft 42 that extends centered along the axial line Ar, and a plurality of blade stages 43 attached to the rotor shaft 42. The plurality of blade stages 43 are aligned in the axial direction. Each of the blade stages 43 includes a plurality of blades 43a aligned in the circumferential direction. The plurality of vane stages 46 are disposed upstream of the respective plurality of blade stages 43. Each of the vane stages 46 is provided inside the turbine casing 45. Each of the vane stages 46 includes a plurality of vanes 46a aligned in the circumferential direction.

A gas flow path 9 through which combustion gas from the combustor 10 flows is formed in the annular space between the outer circumferential side of the rotor shaft 42 and the inner circumferential side of the turbine casing 45 where the vanes 46a and the blades 43a are disposed. The gas flow path 9 has an annular shape centered along the axial line Ar and is long in the axial direction.

The gas turbine 1 includes a first bearing device 5, a second bearing device 6, and a load control device 16 which rotationally support the rotor 2. The first bearing device 5 is provided at the upstream end portion of the rotor 2. The second bearing device 6 is provided at the downstream end portion of the rotor 2.

The first bearing device 5 includes a first journal bearing device 11, a first thrust bearing device 31, a second thrust bearing device 32, and a first lubricating oil supply device 13 (second oil supply system). The journal bearing device 11 is fixed in a casing 7 and restrict movement of the rotor 2 in the radial direction. The first thrust bearing device 31 and the second thrust bearing device 32 are fixed in the casing 7, receive load of the rotor 2 in the axial direction, and restrict movement of the rotor 2 in the axial direction relative to the casing 7.

The first lubricating oil supply device 13 supplies lubricating oil to the first journal bearing device 11 and the thrust bearing devices 31, 32 via a lubricating oil supply line 28. The lubricating oil used for lubrication in the bearing devices is collected via a lubricating oil collection line 29 and reused for lubrication. Accordingly, the lubricating oil is cycled through the bearing devices 11, 31, 32.

The lubricating oil used for lubrication in the first thrust bearing device 31 is collected via a first lubricating oil collection line 29A. The lubricating oil used for lubrication in the second thrust bearing device 32 is collected via a second lubricating oil collection line 29B. A temperature measuring device 30 configured to measure the temperature of the lubricating oil flowing through the first lubricating oil collection line 29A is provided on the first lubricating oil collection line 29A.

The second bearing device 6 includes a second journal bearing device 14 and a second lubricating oil supply device 15.

Figure 2:
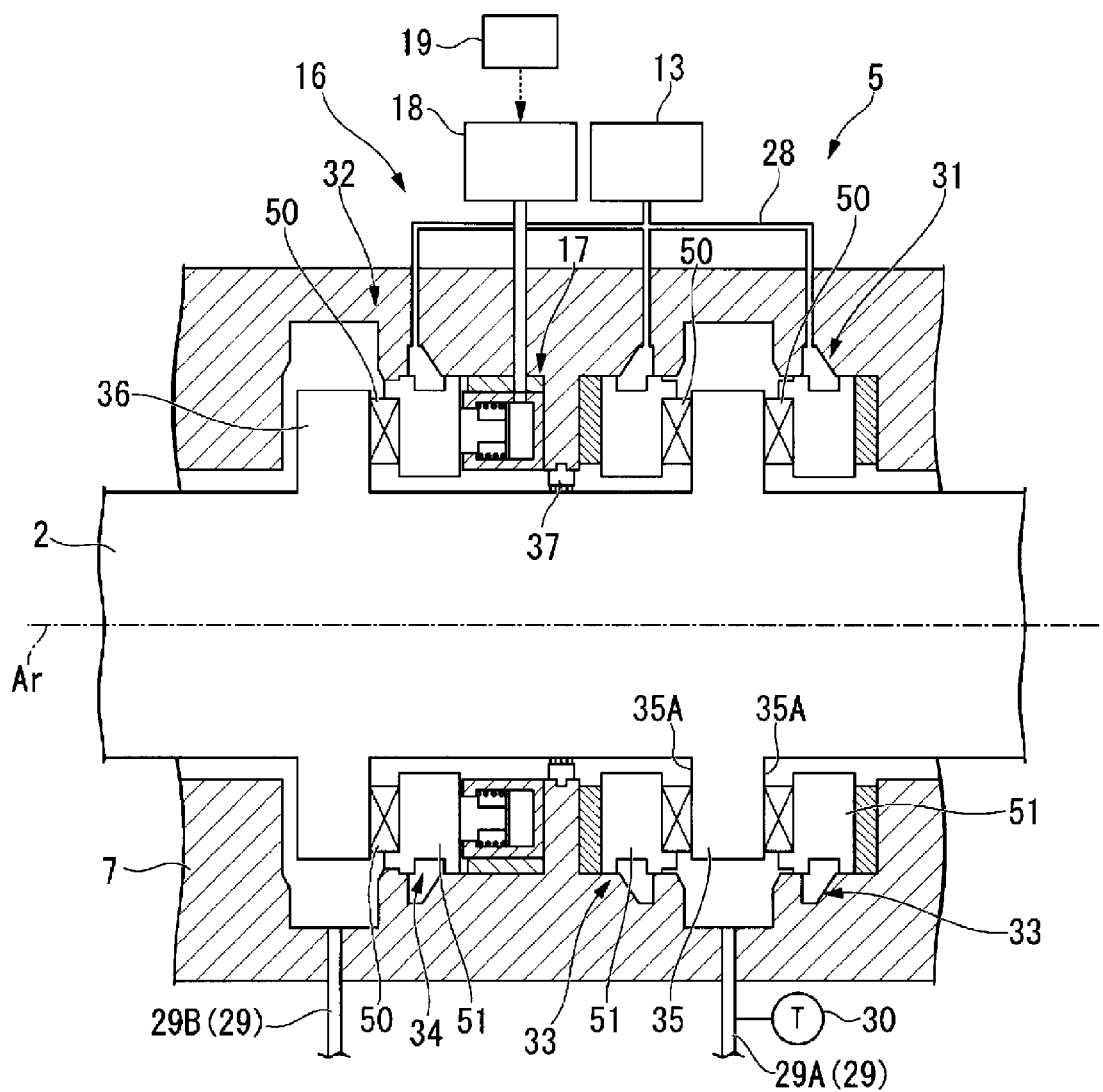
FIG. 2 is a cross-sectional view of a rotor and a first bearing device of a gas turbine according to an embodiment of the present invention.

As illustrated in FIG. 2, the first thrust bearing device 31 includes a pair of first thrust bearing bodies 33. The first thrust bearing bodies 33 are provided corresponding to a first thrust collar 35 formed on the rotor 2. The first thrust collar 35 project radially outward from the outer circumferential surface of the rotor 2.

The first thrust bearing device 31 receives thrust load acting in the axial direction through the first thrust collar 35. The first thrust bearing bodies 33 are disposed upstream and downstream of the first thrust collar 35 in the axial direction.

In other words, the first thrust bearing bodies 33 are disposed on either side of the first thrust collar 35 in the axial direction.

In the gas turbine 1 of the present embodiment, as the output of the gas turbine 1 increases, the rotor 2 is pressed downstream in the axial direction. In other words, of the pair of first thrust bearing bodies 33, mainly the first thrust bearing body 33 disposed downstream in the axial direction receives the thrust load.

The first thrust bearing bodies 33 are disposed opposing surfaces 35A of the first thrust collar 35 facing the axial direction. The first thrust bearing bodies 33 are tilting pad bearings and include a plurality of bearing pads 50 that support load from the first thrust collar 35 and a carrier ring 51 that supports the bearing pads 50.

The plurality of bearing pads 50 have the same shape and are disposed at positions opposing the surfaces 35A of the first thrust collar 35 facing the axial direction at even intervals in the circumferential direction about center of the rotor 2 with symmetry about the axial line Ar. A lubricating oil film that supplies lubricating oil from the first lubricating oil supply device 13 is formed between the first thrust collar 35 and each of the bearing pads 50. This decreases friction and the like between the first thrust collar 35 and the bearing pads 50 when the first thrust collar 35 rotates.

Note that the plurality of bearing pads 50 are not required to have the same shape. The plurality of bearing pads 50 are also not required to be disposed with symmetry about the axial line Ar. For example, the width in the circumferential direction of the bearing pads 50 disposed on the upper side and those disposed on the lower side may differ.

The second thrust bearing device 32 includes a second thrust bearing body 34. The second thrust bearing device 32 receives thrust load acting in the axial direction through a second thrust collar 36. The second thrust bearing body 34 is disposed downstream of the second thrust collar 36 in the axial direction. In other words, the second thrust bearing body 34 is disposed on one side of the second thrust collar 36 in the axial direction. Accordingly, the second thrust bearing body 34 is disposed on the side toward which the second thrust collar 36 moves when the output of the gas turbine 1 increases.

The second thrust bearing body 34 includes the bearing pads 50 and the carrier ring 51. The second thrust bearing body 34 has a similar configuration to that of the first thrust bearing bodies 33, thus description thereof is omitted.

The load control device 16 is configured to control the thrust load acting on the first thrust bearing device 31 by using oil pressure to press the second thrust bearing body 34 in the direction opposite the direction the thrust load is acting on the second thrust bearing device 32. The load control device 16 includes a drive device 17 driven via oil pressure, a hydraulic oil supply device 18 (first oil supply system), and a controller 19.

Figure 3:
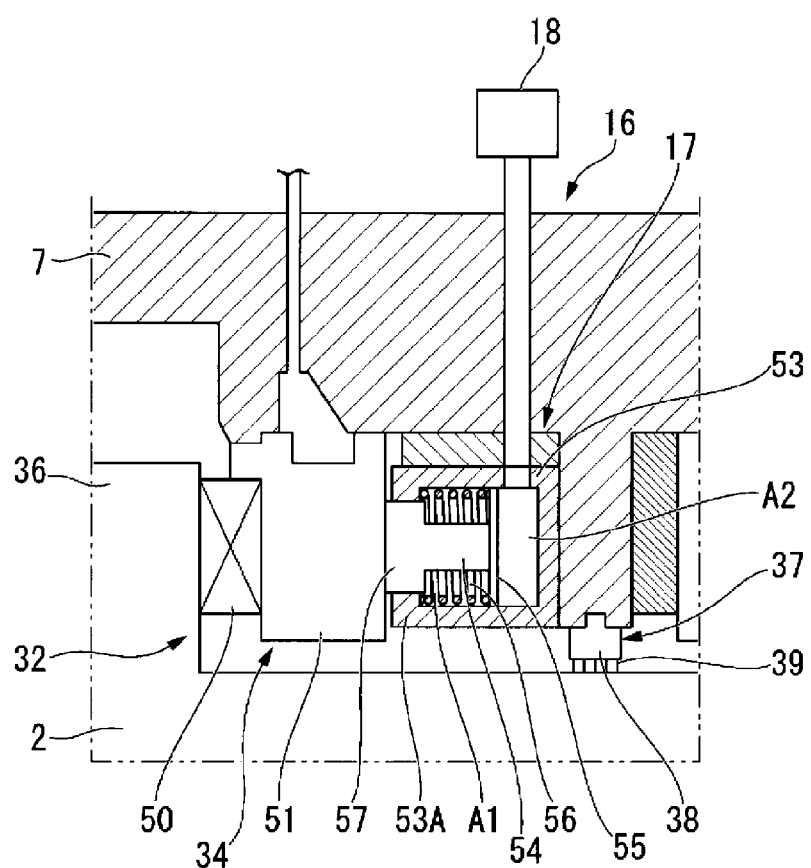
FIG. 3 is a cross-sectional view of a second thrust bearing device according to an embodiment of the present invention.

As illustrated in FIG. 3, the drive device 17 includes a box 53, a plate 55 disposed inside the box 53, a plurality of drive rods 54 that are driven corresponding to the movement of the plate 55, and a spring 56 (elastic member, compression spring). The hydraulic oil supply device 18 supplies hydraulic oil inside the box 53.

The drive device 17 is an actuator that drives the drive rods 54 in the axial direction via the pressure of high pressure hydraulic oil supplied from the hydraulic oil supply device 18. The drive device 17 is fixed to the casing 7.

The box 53 extends in the circumferential direction covering the rotor 2 and is disposed between the second thrust bearing body 34 and the casing 7. The plate 55 is housed in the box 53 are defines the internal space of the box 53 into a first space A1 upstream in the axial direction and a second space A2 downstream in the axial direction. By supplying hydraulic oil to the second space A2, the plate 55 moves upstream in the axial direction.

The plurality of drive rods 54 are disposed at even intervals in the circumferential direction about the center of the rotor 2 with symmetry about the axial line Ar (see FIG. 2). A pressing portion 57 is provided on an axially downstream end portion of the drive rod 54. The axially downstream end portion of the drive rod 54 is connected to the plate 55. The pressing portion 57 is disposed in a manner allowing it to press against the second thrust bearing body 34 in the direction upstream in the axial direction. In other words, by the plate 55 and the drive rod 54 moving upstream in the axial direction, the pressing portion 57 presses the second thrust bearing body 34. This presses the second thrust bearing body 34 upstream in the axial direction.

Note that the plurality of drive rods 54 are also not required to be disposed with symmetry about the axial line Ar.

The drive device 17 is not fixed to the casing 7, thus the second thrust bearing body 34 moves relative to the casing 7.

The spring 56 is a coil-shaped elastic member and a compression spring. The spring 56 is disposed between a wall portion 53A of the box 53 located upstream in the axial direction and the plate 55. The plate 55 is urged in the direction away from the axially upstream wall portion 53A of the box 53 by the returning elastic force of the compressed spring 56. In other words, the drive rod 54 (pressing portion 57) of the drive device 17 is urged in the direction into the inside of the box 53 by the spring 56. Accordingly, the pressing portion 57 moves in the direction away from the second thrust bearing body 34.

Note that in the present embodiment, the spring 56 was employed as an elastic member, but no such limitation is intended. For example, a flat spring or an elastomer may be used.

The controller 19 is a computer configured to control the hydraulic oil supply device 18. The controller 19 includes monitoring functions for output of the gas turbine 1, temperature measured by the temperature measuring device 30, and the like.

A seal device 37 that seals the space between the first thrust collar 35 (see FIG. 2) and the second thrust collar 36 is provided in the casing 7. The seal device 37 includes a seal device body 38 with a ring shape disposed on the inner circumferential surface of the casing 7, and a plurality of seal fins 39 that project from the seal device body 38 toward the outer circumferential surface of the rotor 2.

Next, the method for controlling the load control device 16 of the gas turbine 1 of the present embodiment will be described. The gas turbine 1 of the present embodiment includes the thrust bearing devices 31, 32 that receive thrust load (force acting in the axial direction) of the rotor 2. The load control device 16 includes the function of dispersing thrust load when the thrust load is equal to or greater than the tolerance of the first thrust bearing device 31. This is performed via the second thrust bearing device 32 being pressed in the axial direction.

The method for controlling the load control device 16 includes a first operation step in which mainly the first thrust bearing device 31 receives the load, a load monitoring step in which the load is monitored, and a second operation step in which, in the case the load reaches a preset value, the first thrust bearing device 31 and the second thrust bearing device 32 receive the load.

In the load monitoring step, the controller 19 monitors the output of the gas turbine 1. Here, the output of the gas turbine 1 is proportional to the thrust load acting on the first thrust bearing device 31. Thus, as the output of the gas turbine 1 increases, the thrust load increases.

Note that the method of monitoring the thrust load is not limited to the method of monitoring the output, and a method of monitoring a parameter corresponding to proportionate to thrust load may be used. A method of monitoring, for example, the thrust load itself, the rotational speed of the rotary machine, the metal temperature of the rotary machine or the bearing member, the waste oil temperature of the bearing, and the like, or a combination of two or more thereof may be used. For the method of monitoring thrust load, a method of monitoring the casing pressure of the gas turbine 1 or the pressure ratio of the compressor 20 may be used.

When the output of the gas turbine 1 reaches a preset output value P for the output of the gas turbine 1, the controller 19 in the second operation step moves the second thrust bearing device 32.

In the second operation step, the controller 19 commands the hydraulic oil supply device 18 to supply hydraulic oil to the box 53 of the drive device 17. This moves the plate 55 upstream in the axial direction making the pressing portion 57 press against the carrier ring 51 of the second thrust bearing body 34. This makes the bearing pad 50 press against the second thrust collar 36 and the second thrust bearing device 32 function.

The output value P of the gas turbine referenced in the second operation step is set depending on the rated load of the first thrust bearing bodies 33. The output value P, for example, can be set using the output of the gas turbine 1 when the thrust load acting on the first thrust bearing bodies 33 reaches the rated load.

Additionally, the load control device 16 can adjust the pressing force against the second thrust bearing body 34 via the pressing portion 57 corresponding to the output of the gas turbine 1. For example, as the output increases beyond the output value P described above, the pressing force can be increased.

According to the embodiment described above, when the thrust load acting on the thrust bearing device in the axial direction is excessive, the second thrust bearing body 34 is pressed to control the thrust load acting on the first thrust bearing device 31. This levels the loads on the thrust bearing devices 31, 32. As a result, excessive loads on the thrust bearing device can be managed.

By the plurality of drive rods 54 being connected to the plate 55 extending in the circumferential direction, the pressing force of the plurality of pressing portions 57 can be leveled.

By providing the spring 56 in the drive device 17, when oil pressure in the second space A2 is low, the drive rods 54 can be disposed inside the box 53.

In the embodiment described above, the second thrust bearing body 34 is disposed only on one side of the second thrust collar 36 in the axial direction. By the thrust bearing body being not disposed on both sides of the thrust collar, the number of thrust bearing bodies can be reduced. In other words, the second thrust bearing device 32 is used only when the thrust load acting on the first thrust bearing device 31 is excessive. Thus, there is no need to dispose a thrust bearing device in the direction thrust load does not act when the thrust load is excessive.

By two types of systems, the lubricating oil supply devices 13, 15, which are lubricating oil-supplying systems, and the hydraulic oil supply device 18, which is a hydraulic oil-supplying system, being provided as oil supplying systems, the oil pressure can be independently controlled.

By the first thrust bearing bodies 33 being disposed on both sides of the first thrust collar 35 in the axial direction, when, for example, the output of the gas turbine 1 is low, the thrust load of the rotor 2 pressed upstream in the axial direction can be received.

Note that the embodiment described above has a configuration in which the second thrust bearing body 34 is pressed to reduce the thrust load acting on the first thrust bearing device 31. However, no such limitation is intended. A configuration in which the first thrust bearing bodies 33 are pressed may be employed to reduce the thrust load acting on the second thrust bearing device 32.

First Modified Example

Next, a gas turbine according to a first modified example of the embodiment described above of the present invention will be described.

The gas turbine 1 of the embodiment described above has a configuration in which the load control device 16 is controlled on the basis of the output of the gas turbine 1. However, no such limitation is intended. The temperature of the lubricating oil used in the first thrust bearing device 31 increases in proportion to the thrust load acting on the first thrust bearing device 31. Thus, the load control device 16 may be controlled on the basis of the temperature of the lubricating oil measured by the temperature measuring device 30 provided on the first lubricating oil collection line 29A.

When the controller 19 detects that the temperature of the lubricating oil flowing through the first lubricating oil collection line 29A has reached a preset temperature, the second operation step is executed.

According to the modified example described above, the load control device 16 can be controlled on the basis of the temperature of the lubricating oil, which as a parameter reflects the load of the thrust bearing device.

By the seal device 37 being provided, the lubricating oil used in the first thrust bearing device 31 and the lubricating oil used in the second thrust bearing device 32 can be prevented from mixing. This allows the temperature of the lubricating oil used in the first thrust bearing device 31 to be measured with greater accuracy.

Note that the parameters referenced to control the load control device 16 are not limited to the output of the gas turbine 1 and the temperature of the lubricating oil as described above. For example, the metal temperature of the casing 7, the internal pressure of the casing, the rotational speed of the gas turbine 1, and the like may be referenced.

Second Modified Example

Next, a gas turbine according to a second modified example of the embodiment described above of the present invention will be described.

Figure 4:
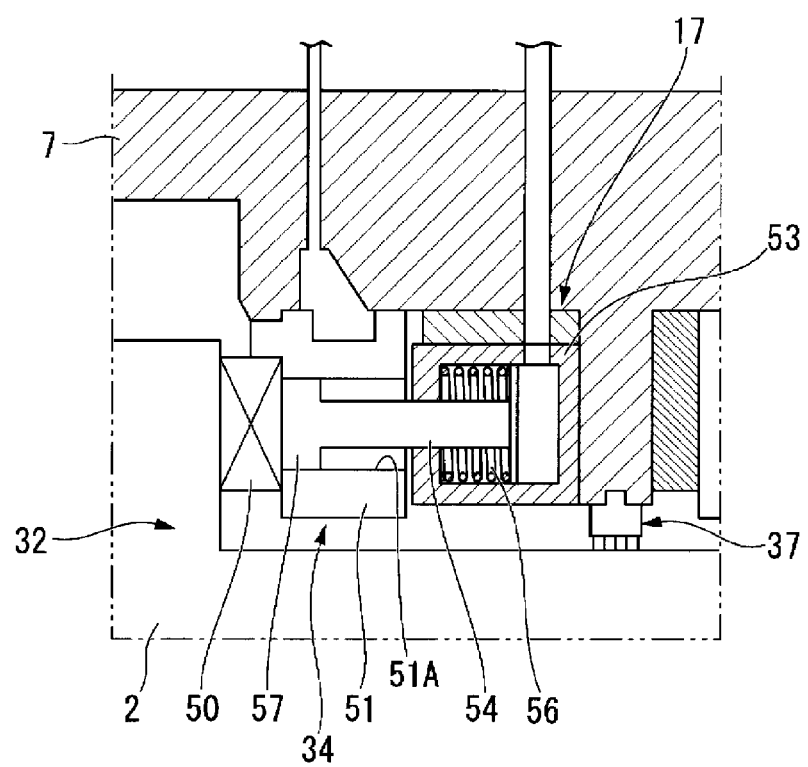
FIG. 4 is a cross-sectional view of a second thrust bearing device according to a second modified example of an embodiment of the present invention.

The gas turbine 1 of the embodiment described above has a configuration in which the drive device 17 presses against the carrier ring 51 of the second thrust bearing body 34. However, no such limitation is intended. As illustrated in FIG. 4, the drive device 17 of the present modified example has a configuration in which the pressing portion 57 of the drive rod 54 of the drive device 17 directly presses against the bearing pad 50 of the second thrust bearing body 34. The drive rod 54 passes through a through hole 51A formed in the carrier ring 51 of the second thrust bearing body 34.

Third Modified Example

Next, a gas turbine according to a third modified example of the embodiment described above of the present invention will be described.

The gas turbine 1 according to the embodiment described above has a configuration in which the pressing portion 57 is separated from the second thrust bearing body 34 via the elastic force of the spring 56, which is a compression spring, separating the wall portion 53A and the plate 55. However, no such limitation is intended.

Figure 5:
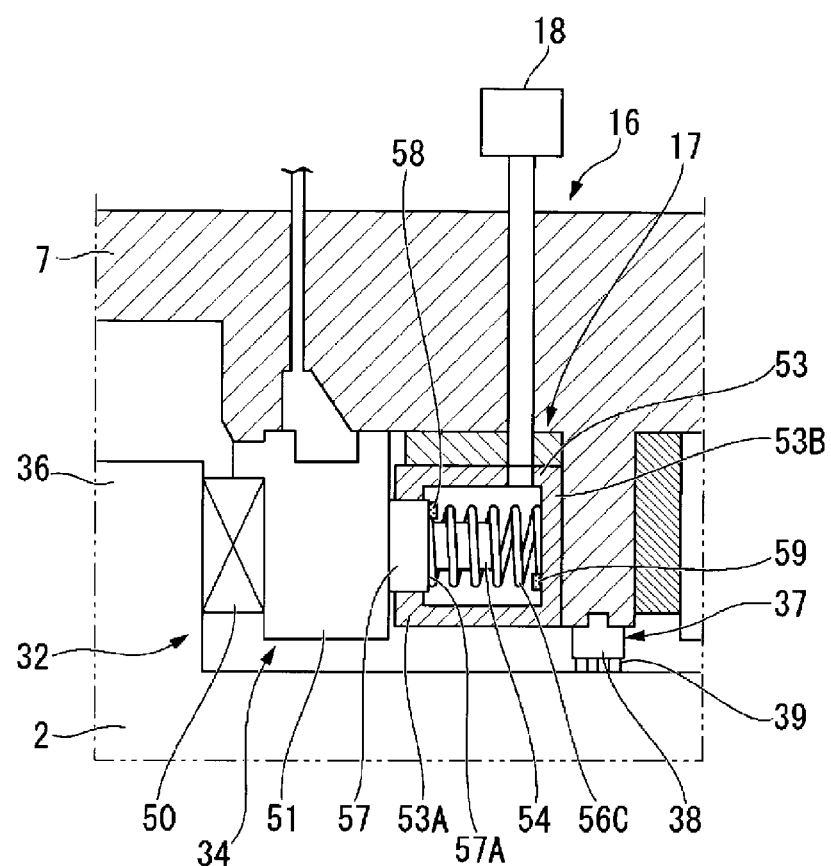
FIG. 5 is a cross-sectional view of a second thrust bearing device according to a third modified example of an embodiment of the present invention.

As illustrated in FIG. 5, the drive device 17 of the present modified example includes a spring 56C connected to a rear surface 57A of the pressing portion 57 and a wall portion 53B located on the downstream side of the box 53 in the axial direction. The spring 56C of the present embodiment is an extension spring. One end of the spring 56C is fixed to the rear surface 57A of the pressing portion 57 via a fixing portion 58. The other end of the spring 56C is fixed to the wall portion 53B of the box 53 via a fixing portion 59.

The pressing portion 57 and the wall portion 53B are urged in the direction toward one another by the returning elastic force of the extended spring 56C. In other words, the drive rod 54 (pressing portion 57) of the drive device 17 is urged in the direction into the inside of the box 53 by the spring 56C. Accordingly, the pressing portion 57 moves in the direction away from the second thrust bearing body 34.

According to this modified example, the plate 55 of the drive device 17 of the first embodiment is not necessary.

While the above has described embodiments of the present invention in detail with reference to the drawings, each configuration of each embodiment and the combinations thereof are merely examples, and additions, omissions, substitutions, and other changes may be made without deviating from the spirit and scope of the present invention. The present invention is not to be considered as being limited by the foregoing description but is only limited by the scope of the appended claims.

For example, in the embodiments described above, a gas turbine was used as an example of a rotary machine. However, any rotary machine with a rotor that experiences thrust load may be employed in the present invention such as a steam turbine, an axial flow compressor, and the like.

Additionally, in the embodiments described above, the first thrust bearing device 31 and the second thrust bearing device 32 are both tilting pad bearings. However, no such limitation is intended. For example, one of the first thrust bearing device 31 and the second thrust bearing device 32 may be a thrust roller bearing.

REFERENCE SIGNS LIST

1 Gas turbine
2 Gas turbine rotor
3 Gas turbine casing
5 First bearing device
6 Second bearing device
7 Casing
10 Combustor
11 First journal bearing device
13 First lubricating oil supply device (second oil supply system)
14 Second journal bearing device
15 Second lubricating oil supply device
16 Load control device
17 Drive device
18 Hydraulic oil supply device (first oil supply system)
19 Controller
20 Compressor
25 Compressor casing
28 Lubricating oil supply line
29 Lubricating oil collection line
30 Temperature measuring device
31 First thrust bearing device
32 Second thrust bearing device
33 First thrust bearing body
34 Second thrust bearing body
35 First thrust collar
36 Second thrust collar
37 Seal device
38 Seal device body
39 Seal fin
40 Turbine
45 Turbine casing
50 Bearing pad
51 Carrier ring
53 Box
54 Drive rod
55 Plate
56, 56C Spring (elastic member)
57 Pressing portion
Ar Axial line

The invention claimed is:

1. A method for controlling a rotary machine comprising a rotor extending in an axial direction, and a first thrust bearing device and a second thrust bearing device configured to receive load acting on the rotor in the axial direction, the method comprising:
  a first operation step in which mainly the first thrust bearing device receives the load;
  a load monitoring step in which the load is monitored; and
  a second operation step in which, when the load reaches a preset value, the first thrust bearing device and the second thrust bearing device receive the load.

2. A rotary machine, comprising:
  a rotor extending in an axial direction, the rotor comprising a first thrust collar and a second thrust collar projecting radially outward;
  a first thrust bearing device configured to receive load acting in the axial direction via the first thrust collar;
  a second thrust bearing device configured to receive load acting in the axial direction via the second thrust collar; and
  a load control device configured to control load acting on at least one of the first thrust bearing device and the second thrust bearing device, wherein
  the second thrust bearing device comprises a second thrust bearing body configured to support a surface of the second thrust collar facing the axial direction,
  the load control device comprises a drive device configured to press the second thrust bearing body in the axial direction,
  the second thrust bearing body comprises a bearing pad configured to support load from the second thrust collar, and a carrier ring configured to support the bearing pad, and
  the drive device is configured to press the bearing pad.

3. The rotary machine according to claim 2, wherein the second thrust bearing body is disposed only on one side of the second thrust collar in the axial direction.

4. The rotary machine according to claim 3, wherein
the first thrust bearing device comprises a first thrust bearing body configured to support a surface of the first thrust collar facing the axial direction; and
the first thrust bearing body is disposed on either side of the first thrust collar in the axial direction.

5. A rotary machine, comprising:
a rotor extending in an axial direction, the rotor comprising a first thrust collar and a second thrust collar projecting radially outward;
a first thrust bearing device configured to receive load acting in the axial direction via the first thrust collar;
a second thrust bearing device configured to receive load acting in the axial direction via the second thrust collar; and
a load control device configured to control load acting on at least one of the first thrust bearing device and the second thrust bearing device, wherein
the second thrust bearing device comprises a second thrust bearing body configured to support a surface of the second thrust collar facing the axial direction,
the second thrust bearing body is disposed only on one side of the second thrust collar in the axial direction,
the first thrust bearing device comprises a first thrust bearing body configured to support a surface of the first thrust collar facing the axial direction, and
the first thrust bearing body is disposed on either side of the first thrust collar in the axial direction.

6. The rotary machine according to claim 5, wherein
the load control device comprises a drive device configured to press the second thrust bearing body in the axial direction,
the second thrust bearing body comprises a bearing pad configured to support load from the second thrust collar, and a carrier ring configured to support the bearing pad, and
the drive device is configured to press the bearing pad.

7. The rotary machine according to claim 2, wherein:
the load control device comprises a first oil supply system configured to supply oil to the drive device, and a controller configured to control oil pressure of the oil; and
the drive device is configured to press the second thrust bearing body via the oil pressure in a direction opposite a direction load acts on the second thrust bearing device.

8. The rotary machine according to claim 7, wherein the drive device comprises a drive rod comprising a pressing portion configured to press the second thrust bearing body, and an elastic member configured to urge the drive rod in a direction which the pressing portion separates away from the second thrust bearing body.

9. The rotary machine according to claim 2, wherein at least one of the first thrust bearing device and the second thrust bearing device comprises a bearing pad opposing a surface of the respective thrust collar facing the axial direction,
further comprising a second oil supply system configured to supply lubricating oil between the bearing pad and the surface of the respective thrust collar facing the axial direction.

* * * * *